3,002,993
SUBSTITUTED TRIOXO-OCTAHYDROANTHRA-
CENES AND OCTAHYDRONAPHTHACENES
Raymond G. Wilkinson, Montvale, N.J., and Thomas
L. Fields, Pearl River, and Andrew S. Kende, Harts-
dale, N.Y., assignors to American Cyanamid Company,
New York, N.Y., a corporation of Maine
No Drawing. Filed Jan. 30, 1959, Ser. No. 790,051
11 Claims. (Cl. 260—473)

This invention relates to new organic compounds and more particularly is concerned with novel substituted trioxo-octahydroanthracenes which may be represented by the following general formula:

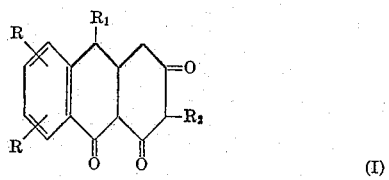

wherein R is hydrogen, halogen, hydroxy, lower alkyl, lower alkoxy, acyloxy or an aralkoxy radical, $R_1$ is hydrogen, hydroxy, lower alkyl or a lower alkoxy radical, and $R_2$ is hydrogen, cyano, carboxamido or COOX wherein X is lower alkyl, mononuclear aryl or mononuclear aralkyl and to novel tetracyclic compounds which may be represented by the following general formula:

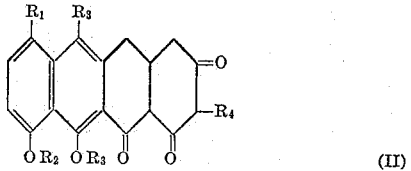

wherein $R_1$ is hydrogen or halogen, $R_2$ is hydrogen, lower alkyl, acyl or mononuclear aralkyl, $R_3$ is hydrogen or lower alkyl and $R_4$ is hydrogen, cyano or COOX wherein X is lower alkyl, mononuclear aryl or mononuclear aralkyl. Suitable lower alkyl and lower alkoxy groups contemplated by the present invention are those having up to about 6 carbon atoms. Suitable aralkoxy groups are benzyloxy, phenethoxy, etc. Suitable mononuclear aralkyl substituents are benzyl, phenethyl, phenylpropyl, phenylbutyl, etc. and suitable mononuclear aryl substituents are exemplified by phenyl and substituted phenyl, suitable substituents on the phenyl ring being —Cl, —Br, —I, —NO₂, and lower alkyl radicals containing from 1 to 4 carbon atoms. Halogen is exemplified by chlorine and bromine.

The novel compounds are useful in the synthesis of polyoxygenated cyclic compounds such as, for example, certain tetracyclic esters. In addition, the new compounds are particularly effective as chelating, complexing or sequestering agents for polyvalent metallic ions. The complexes formed with polyvalent metallic ions are particularly stable and usually squite soluble in various organic solvents. This, of course, makes them useful for a variety of purposes such as in biological experimentation where the removal of traces of polyvalent metallic ions may be of great importance. They are also useful in analyses for polyvalent metallic ions which may be complexed and extracted by means of these reagents. Other uses common to sequestering agents are also apparent for these compounds.

The new compounds represented by (I) above may be prepared by a series of reactions starting with the tetrahydro-4-oxo-2-naphthaleneacetic acids described and claimed in the copending application of Raymond G. Wilkinson et al., Serial No. 748,613, filed July 15, 1958, now abandoned. In accordance with the present invention, the tetrahydronaphthalene-2-acetic acid is first converted to the corresponding acyl halide by treatment with a suitable agent such as oxalyl chloride, or alternatively, by using a mixed carboxylic-carbonic anhydride derivative. Diethyl malonate is then acylated and the resultant acyl malonate cyclized to the octahydroanthracene. The octahydroanthracene can be treated to remove the carbethoxy group or can be converted to 2-carboxamido-octahydroanthracene by first treating with alcoholic ammonia at 70–110° in a sealed vessel followed by strong acid hydrolysis.

In order to prepare the novel tetracyclic compounds represented by Formula II above, the tetrahydronaphthaleneacetic acid is first converted to the corresponding acyl halide by treatment with an agent such as oxalyl chloride. The intermediate acyl halide so formed is then converted to the desired naphthaleneacetaldehyde by a suitable reduction process. The aldehyde so formed is then treated with cyanoacetamide to form the corresponding dicyano glutaramide, which product is hydrolyzed in hydrochloric acid in the conventional manner. The glutaric acid is then subjected to a two-step methylation and the resulting product is treated with sodium hydride to form the corresponding octahydroanthracene-acetate. This product is then brominated to form the appropriate gromoketone which is treated with boiling collidine to form the corresponding naphthol. This latter product is methylated with potassium carbonate and dimethyl sulfate. The tricyclic acid is obtained by alkaline hydrolysis and is then treated with oxalyl chloride, or alternatively with ethyl chloroformate and then with malonic ester and finally with sodium hydride to form the desired tetracycline ester. The conditions leading to the formation of product (II) are detailed in the examples which follow.

EXAMPLE 1

*Preparation of diethyl 8-chloro-5-methoxy-4-oxo-1,2,3,4-tetrahydronaphthalene-2-acetyl malonate*

Following the procedure of the aforesaid copending application Serial No. 748,613, 2-chloro-5-methoxy toluene is brominated to the corresponding benzyl bromide. The resulting compound is treated with diethyl malonate and the benzyl malonic ester so formed is reduced with lithium aluminum hydride in a conventional manner to form the corresponding propanediol. The bis-methane sulfonate is then formed with methanesulfonylchloride and the resulting compound is converted to the corresponding dinitrile by reaction with an alkali metal cyanide. The dinitrile is hydrolyzed to the corresponding benzyl glutaric acid in a refluxing solution of base. The glutaric acid is then converted to the corresponding naphthaleneacetic acid by treatment with polyphosphoric acid.

To a solution of 270 milligrams (0.001 mole) of the so-prepared 8 - chloro-5-methoxy-4-oxo-1,2,3,4-tetrahydronaphthalene-2-acetic acid in 15 cc. of dry tetrahydrofuran is added 101 milligrams (0.14 cc., 0.001 mole) of triethylamine and the solution is then cooled in an ice-alcohol bath to −10 to −12°. To the reaction is added 108.5 milligrams (0.095 cc., 0.001 mole) of ethyl chloroformate, and then 0.001 mole of diethyl magnesiomalonate dissolved in 20 cc. of dry ether. The reaction is now allowed to stand at room temperature for two days and is then evaporated to dryness in vacuo and the residue taken up in 20 cc. of ether and 20 cc. of 0.05 N HCl. The ether layer is washed three times with water and then 10 cc. of an aqueous solution of cupric acetate are mixed well with the ether. A blue solid forms slowly and after several hours the mixture is centrifuged. The solid is collected at the interface and both layers are poured off and the solid is collected on a filter. After washing with water and ether and drying, the solid weights 270 milligrams. A suspension of 150 milligrams of this product in 3 cc. of water is heated on the steam bath and methanol is added slowly until nearly all is in solution (about 7 cc. of methanol). After filtering and cooling, a blue crystalline solid is deposited slowly. This product is filtered off, washed well and dried at 60° for 6 hours in vacuo; weight, 90 milligrams; M.P. shrinks at 77–100°. and slowly melts at 77–100°.

*Analysis.*—Calculated for $C_{40}H_{40}O_{14}Cl_2Cu$: Cl, 8.06; Cu, 7.25; $OCH_3$, 21.2. Found: Cl, 8.19; Cu, 7.27; $OCH_3$, 22.10.

EXAMPLE 2

*Preparation of diethyl 5-acetoxy-8-chloro-1,2,3,4-tetrahydro-4-oxo-2-naphthylacetyl malonate*

Following the procedure of the aforesaid copending application, 5-acetoxy-8-chloro-1,2,3,4-tetrahydro-4-oxo-2-naphthalene acetic acid is prepared from 8-chloro-5-methoxy - 4 - oxo-1,2,3,4-tetrahydronaphthalene-2-acetic acid by acid cleavage of the methyl ether followed by acetylation with acetic anhydride.

297 milligrams (0.001 mole) of the so-prepared 5-acetoxy - 8 - chloro - 1,2,3,4-tetrahydro-4-oxo-2-naphthalene-acetic acid is dissolved in 15 milliliters of chloroform and the solution is cooled in an ice-ethanol bath to −12° and triethylamine (0.14 milliter, 0.001 mole) is added. Ethyl chloroformate (0.1 milliliter, 0.001 mole) is added to the clear solution and allowed to stir at −12° for ten minutes. Diethyl magnesiomalonate (0.001 mole in 15 milliliters ether) is added, the ice bath removed and the mixture stirred overnight at room temperature. The reaction mixture is then concentrated to dryness in vacuo, the residue taken up in 25 milliliters of ether and shaken mechanically with 15 milliliters of 0.3 N HCl for 1 hour. The ethereal layer is separated, washed twice with 10 milliliter portions of water, and then shaken with 15 milliliters of copper acetate solution. A blue solid forms slowly and is collected on a filter after 8 hours. Yield of copper salt of diethyl 5-acetoxy - 8 - chloro-1,2,3,4-tetrahydro-4-oxo-2-naphthylacetyl malonate, 160 milligrams. A small quantity is recrystallized from a toluene-hexane mixture for analysis; M.P. 180 to 198°.

*Analysis.*—Calculated for $C_{21}H_{22}ClO_8Cu_{1/2}$: C, 52.64; H, 4.76; Cl, 7.58; Cu, 6.80. Found: C, 53.81; H, 5.02; Cl, 7.60; Cu, 7.27, 7.38, 7.00.

EXAMPLE 3

*Preparation of diethyl 5-benzyloxy-8-chloro-1,2,3,4-tetrahydro-4-oxo-2-naphthylacetyl malonate*

Following the procedure of the aforesaid copending application, 5 - benzyloxy-8-chloro-1,2,3,4-tetrahydro-4-oxo-2-naphthaleneacetic acid is prepared from 8-chloro-5 - methoxy-4-oxo-1,2,3,4-tetrahydronaphthalene-2-acetic acid by acid cleavage of the methyl ether followed by benzylation with benzyl chloride.

329 milligrams (0.00095 mole) of the so-prepared 5-benzyloxy - 8 - chloro - 1,2,3,4-tetrahydro-4-oxo-2-naphthaleneacetic acid is slurried in 25 milliliters of chloroform and the suspension is cooled in an ice-ethanol bath to −12°, and triethylamine (0.14 milliliter, 0.001 mole) is added. Ethyl chloroformate (0.1 milliliter, 0.001 mole) is added to the resultant clear solution and allowed to stir at −12° for ten minutes. Diethyl magnesiomalonate (0.001 mole in 5 milliliters of toluene) is then added, the ice bath removed and the mixture stirred overnight at room temperature. The reaction mixture is then concentrated to dryness in vacuo, the residue taken up in 25 milliliters of ether and shaken mechanically with 15 milliliters of 0.3 N HCl for one hour. The ethereal layer is separated, washed twice with 10 milliliter portions of water, and then shaken mechanically with 15 milliliters of copper acetate solution. A blue solid forms slowly and is collected on a filter after 14 hours. The impure copper derivative is recrystallized from a chloroform-hexane mixture to yield 220 milligrams of pure copper salt of diethyl 5-benzyloxy-8-chloro-1,2,3,4-tetrahydro-4-oxo-2-naphthylacetyl malonate, M.P. 175–8°.

*Analysis.*—Calculated for $C_{26}H_{26}ClO_7Cu_{1/2}$: C, 60.31; H, 5.06; Cl, 6.85; Cu, 6.14. Found: C, 60.20; H, 5.09; Cl, 7.27; Cu, 6.07.

EXAMPLE 4

*Preparation of 2-carbethoxy-5-chloro-8-methoxy-1,3,9-trioxo-1,2,3,4,4a,9,9a,10-octahydroanthracene*

8 - chloro - 5 - methoxy - 4 - oxo - 1,2,3,4 - tetrahydro - naphthalene-2-acetic acid (10.8 grams, 0.040 mole), prepared following the procedure outlined in Example 1, is suspended in 50 milliliters of sodium dried benzene. The suspension is refluxed and a solution of oxalyl chloride (6.42 milliliters, 0.080 mole) in 50 milliliters of sodium dried benzene is added dropwise over a thirty minute period. A clear yellow solution forms as the reaction proceeds. The solution is refluxed an additional thirty minutes and then the excess oxalyl chloride and benzene are removed under reduced pressure. The oily residue is dissolved in 25 milliliters of benzene and again concentrated to an oil under reduced pressure. The oily acid chloride is dissolved in 100 milliliters of sodium dried toluene.

The magnesium salt of diethyl malonate is prepared by heating magnesium metal (972.8 milligrams, 0.040 mole), carbon tetrachloride (0.3 milliliter), absolute ethanol (7.28 milliliters) and diethyl malonate (6.08 milliliters, 0.40 mole) intermittently on a steam bath for fifteen minutes, then 100 milliliters of sodium dried ether is added and refluxed with stirring until all of the magnesium is dissolved (approximately two hours). The ethereal solution of magnesiomalonic ester is cooled to room temperature and the toluene solution of the acid chloride prepared above is added dropwise, with stirring, over a thirty minute period. After seven minutes sodium chloride begins precipitating. After ten minutes the magnesium salt of the acylated malonic ester begins separating as a yellow gum. The reaction mixture is refluxed for twenty minutes after the addition of the acid chloride, is cooled to room temperature and sodium hydride added (4.0 grams, 0.160 mole). An additional 200 milliliters of sodium dried toluene is added and the ether removed by distillation. The reaction mixture is then refluxed for seventeen hours. The dark brown suspension is cooled to room temperature and 10 milliliters of absolute ethanol added to decompose the excess sodium hydride. The reaction mixture is mechanically shaken for one hour with 200 milliliters of 1 N HCl, the toluene layer separated, washed twice with water, dried over anhydrous magnesium sulfate and filtered. The filtrate is concentrated under reduced pressure to a syrupy residue and 50 milliliters of absolute ethanol added. The mixture is heated on a steam bath and allowed to slowly cool to room temperature. Brownish yellow crystals of crude cyclized product are deposited. Yield 4.97 grams (34%), M.P. 159–64°. 4.68 grams of the crude are recrystallized from 200 milliliters of absolute ethanol and 20 milliliters of dimethylformamide, yielding 3.72 grams of the pure octahydroanthracene (26.7%), M.P. 164–7°.

*Analysis.*—Calculated for $C_{18}H_{17}ClO_6$: C, 59.26; H, 4.70; Cl, 9.72. Found: C, 59.39; H, 4.69; Cl, 9.76.

EXAMPLE 5

*Preparation of ethyl 8-benzyloxy-5-chloro-1,2,3,4,4a,9,9a, 10-octahydro-1,3,9-trioxo-2-anthroate*

5 - benzyloxy - 8 - chloro - 1,2,3,4 - tetrahydro - 4 - oxo-2-naphthaleneacetic acid (1.3 grams, 0.004 mole), prepared following the procedure outlined in Example 3, is slurried in 40 milliliters of toluene. The suspension is cooled in an ice-ethanol bath to −12° and triethylamine (0.56 milliliter, 0.004 mole) added. Ethyl chloroformate (0.38 milliliter, 0.004 mole) is added to the clear solution and allowed to stir at −12° for ten minutes. Diethyl magnesiomalonate (0.004 mole in 20 milliliters of toluene) is added, the ice bath removed and the mixture is stirred at room temperature for three hours. The reaction mixture is then washed with 20 milliliters of 1 N NCl and three 15 milliliter portions of water. The toluene layer is dried over anhydrous magnesium sulfate, filtered and azeotropically distilled to remove any residual water. Sodium hydride (386 milligrams, 0.016 mole) is added to the thoroughly dried toluene solution and the mixture refluxed for 1.5 hours, during which time a dark brown color develops. The reaction is then cooled, 5 milliliters of ethanol added to decompose any residual sodium hydride and shaken with 20 milliliters of 6 N HCl. The aqueous layer is extracted with three ten milliliter portions of toluene and the combined toluene layers washed thrice with 15 milliliter portions of water, dried over anhydrous magnesium sulfate and concentrated to a dark brown oil in vacuo. Upon the addition of 10 milliliters of ether, light yellow crystals are deposited. The crystals are collected on a filter, washed thoroughly with several portions of ether and air dried. Yield of ethyl 8 - benzyloxy - 5 - chloro - 1,2,3,4,4a,9,9a,10 - octahydro - 1,3,9-trioxo-2-anthroate, 640 milligrams (36.2%), M.P. 149–52°. Recrystallization of a small amount from ethanol raises the M.P. to 150–52°.

*Analysis.*—Calculated for $C_{24}H_{21}ClO_6$: C, 65.5; H, 4.80; Cl, 8.06. Found: C, 65.72; H, 5.08; Cl, 8.23.

EXAMPLE 6

*Preparation of ethyl 5-chloro-1,2,3,4,4a,9,9a,10-octahydro-8-hydroxy-1,3,9-trioxo-2-anthroate*

A solution of ethyl 8-benzyloxy-5-chloro-1,2,3,4,4a,9,9a,10-octahydro-1,3,9-trioxo-2-anthroate (220 milligrams, 0.0005 mole) in 20 milliliters of methyl Cellosolve is added to a suspension of pre-reduced platinum oxide (22 milligrams) in 25 milliliters of methyl Cellosolve and 1 drop of glacial acetic acid is added. The mixture is reduced with hydrogen at atmospheric pressure. After 2.5 hours two equivalents of hydrogen are absorbed and the reaction slows appreciably. The catalyst is removed by filtration and the solution concentrated to dryness in vacuo. The crude product is recrystallized from 7 milliliters of ethanol. Yield of pure ethyl 5-chloro-1,2,3,4,4a,9,9a,10-octahydro-8-hydroxy-1,3,9-trioxo-2-anthroate, 115 milligrams (72.7%), bright yellow crystals, M.P. 142–4°.

*Analysis.*—Calculated for $C_{17}H_{15}O_6Cl$: C, 58.2; H, 4.31; Cl, 10.13. Found: C, 58.54; H, 4.67; Cl, 10.12.

EXAMPLE 7

*Preparation of 5-chloro-8-methoxy-1,3,9-trioxo-1,2,3,4,4a,9,9a,10-octahydroanthracene*

2 - carbethoxy - 5 - chloro - 8 - methoxy - 1,3,9 - trioxo-1,2,3,4,4a,9,9a,10-octahydroanthracene (900 milligrams, 0.0025 mole), prepared in Example 4, is dissolved in 50 milliliters of 1 N sodium hydroxide. The solution is heated on a steam bath for six hours in an atmosphere of nitrogen. The reaction mixture is then cooled and acidified to pH 1 with 4 N hydrochloric acid. The yellow crystals which precipitate are collected on a filter and dried in a vacuum desiccator over $P_2O_5$. Yield of crude product 615 milligrams (88.6%). Recrystallization of 100 milligrams from 2 milliliters of 95% ethanol gives 40 milligrams of pure 5-chloro-8-methoxy-1,3,9-trioxo-1,2,3,4,4a,9,9a,10-octahydroanthracene, M.P. 168–73°, with dec.

*Analysis.*—Calculated for $C_{15}H_{13}O_4Cl$: C, 61.55; H, 4.48; Cl, 12.11. Found: C, 61.55; H, 4.69; Cl, 12.03.

EXAMPLE 8

*Preparation of 2-carboxamido-5-chloro-8-methoxy-1,3,9-trioxo-1,2,3,4,4a,9,9a,10-octahydroanthracene*

A suspension of 2-carbethoxy-5-chloro-8-methoxy-1,3,9 - trioxo - 1,2,3,4,4a,9,9a,10 - octahydroanthracene (1.0 gram, 0.00276 mole) in 25 milliliters of absolute methanol contained in a stainless steel bomb is cooled to 0° and saturated with anhydrous ammonia. The bomb is sealed, heated at 80° for five hours and then allowed to stand at room temperature overnight. The methanol is evaporated off under an air jet at room temperature and the residue slurried in 10 milliliters of 1 N NaOH. The tan solid is collected on a filter and then heated in 10 milliliters of ethanol. The insoluble portion is collected on a filter and dried in vacuo over $P_2O_5$, to yield 350 milligrams of crude product. 150 milligrams of this material is heated on a steam bath for ten minutes with 15 milliliters of 4 N HCl. The yellow crystals are collected and recrystallized from a dimethylformamide-water mixture, yielding 65 milligrams of 2-carboxamido-5-chloro-8-methoxy-3-(or 1- or 9-)imino-1,9-dioxo-1,2,3,4,4a,9,9a,10-octahydroanthracene, M.P. 194–197° with dec.

Crude 2-carboxamido-5-chloro-8-methoxy-3-(or 1- or 9 - )imino - 1,9 - dioxo - 1,2,3,4,4a,9,9a,10 - octahydroanthracene (100 milligrams) is heated on a steam bath with 5 milliliters of 4 N HCl for three hours and then allowed to stand at room temperature for an additional three hours. The reaction mixture is filtered and the crude amide recrystallized from a dimethylformamide-ethanol mixture, yielding 55 milligrams of pure 2-carboxamido - 5 - chloro - 8 - methoxy - 1,3,9 - trioxo - 1,2,3,4,4a,9,9a,10-octahydroanthracene, M.P. 239–241° dec.

*Analysis.*—Calculated for $C_{16}H_{14}NClO_5$: C, 57.24; H, 4.20; N, 4.17; Cl, 10.56. Found: C, 57.32; H, 4.54; N, 4.39; Cl, 10.59.

EXAMPLE 9

*Preparation of 5-chloro-1,2,3,4,4a,9,9a,10-octahydro-8-hydroxy-1,3,9-trioxo-2-anthramide*

5 - chloro - 1,2,3,4,4a,9,9a,10 - octahydro - 8 - methoxy-1,3,9-trioxo-2-anthramide (460 milligrams, 0.00137 mole), is slurried in 25 milliliters of anhydrous 30% HBr in glacial acetic acid. The reaction mixture is refluxed for 1.5 hours and the solution concentrated to dryness in vacuo. The residual dark green solid is washed with water until the washings give a negative silver nitrate test. The crude demethylated product (400 milligrams) is dissolved with the aid of heat in 40 milliliters of methyl Cellosolve, treated with decolorizing carbon and filtered. The filtrate is concentrated to 25 milliliters and 10 drops of water added. Upon cooling light yellow crystals precipitate, are collected on a filter and dried in vacuo at 100°. Yield of 5-chloro-1,2,3,4,4a,9,9a,10-octahydro-8-hydroxy-1,3,9-trioxo-2-anthramide, 180 milligrams M.P. 230–3°. Upon standing overnight at 5° the filtrate yields an additional 54 milligrams of the demethylated compound. Total yield 234 milligrams (53%).

*Analysis.*—Calculated for $C_{15}H_{12}O_5ClN$: C, 56.0; H, 3.77; Cl, 11.05; N, 4.36. Found: C, 56.29; H, 4.08; Cl, 10.98; N, 4.76.

EXAMPLE 10

*Preparation of 2,2'-dicyano-3-(8-chloro-1,2,3,4-tetrahydro-5-methoxy-4-oxo-2-naphthylmethylglutaramide)*

Cyanoacetamide (8.0 grams, .095 mole) and 8-chloro-1,2,3,4 - tetrahydro - 5 - methoxy - 4 - oxo - 2 - naphthaleneacetaldehyde, prepared by reduction of the corresponding naphthaleneacetyl chloride described in Example 4, are dissolved in absolute ethanol (300 milliliters) with the aid of heat. The solution is cooled, filtered, five drops of piperidine added and the liquid is allowed to stand at room temperature for 24 hours. The white crystals (11.7 grams, 92%) which deposit are collected by suction filtration, washed with ether, and air-dried. This highly insoluble product has a melting point of 140–155°, but the melting point of other batches run in a similar manner varies from 105 to 160°, despite constant analyses. The sample is dried for analysis at 60° for 3 hours in vacuo.

*Analysis.*—Calculated for $C_{19}H_{19}O_4N_4Cl \cdot C_2H_6O$: C, 56.2; H, 5.62; N, 12.49; Cl, 7.92. Found: C, 55.61; H, 5.62; N, 12.54; Cl, 8.40.

EXAMPLE 11

*Preparation of 3-(8-chloro-1,2,3,4-tetrahydro-5-hydroxy-4-oxo-2-naphthylmethyl)-glutaric acid*

2,2' - dicyano - 3 - (8 - chloro - 1,2,3,4 - tetrahydro - 5 - methoxy - 4 - oxo - 2 - naphthylmethyl)glutaramide (10.0 grams, 0.0249 mole) is slurried in a mixture of concentrated hydrochloric acid (405 milliliters) and glacial acetic acid (135 milliliters). Upon refluxing a clear yellow solution forms which gradually turns bright red then brown. After twelve hours the reaction is cooled and filtered. The filtrate is concentrated in vacuo to approximately two-thirds volume. The light yellow crystals which separate are collected on a filter, washed thoroughly with water and dried in vacuo over phosphorous pentoxide and potassium hydroxide pellets. Yield of the glutaric acid is 5.9 grams (70%), M.P. 177–80°. Recrystallization from ethyl acetate raises the melting point to 181.5–182°.

*Analysis.*—Calculated for $C_{16}H_{17}ClO_6$: C, 56.4; H, 5.03; Cl, 10.42. Found: C, 56.45; H, 5.30; Cl, 10.36.

EXAMPLE 12

*Preparation of 3-(5-benzyloxy-8-chloro-1,2,3,4-tetrahydro-4-oxo-2-naphthylmethyl)glutaric acid*

3 - (8 - chloro - 1,2,3,4 - tetrahydro - 5 - hydroxy - 4-oxo-naphthylmethyl)glutaric acid (0.920 gram, 0.0027 mole) is dissolved in 25 milliliters of 1 N sodium hydroxide. Benzyl chloride (1.8 grams, 0.0142 mole) is added and the mixture refluxed for two hours under nitrogen. The reaction is cooled and extracted with five 20 milliliter portions of ether. The aqueous layer is separated, acidified and the tan oily solid which separates is extracted into ethyl acetate. The organic layer is dried over anhydrous magnesium sulfate, filtered and concentrated to a light tan solid in vacuo. Crude 3-(5-benzyloxy-8 - chloro - 1,2,3,4 - tetrahydro -4 - oxo - naphthylmethyl)-glutaric acid (1.1 gram) is obtained.

An analytical sample is obtained from ethyl acetate as a colorless microcrystalline solid, M.P. 174–176°.

*Analysis.*—Calculated for $C_{23}H_{23}O_6Cl$: C, 64.2; H, 5.38; Cl, 8.25. Found: C, 64.68; H, 6.17; Cl, 8.22.

EXAMPLE 13

*Preparation of dimethyl 3-(5-benzyloxy-8-chloro-1,2,3,4-tetrahydro-4-oxo-2-naphthylmethyl)glutarate*

Crude 3-(5-benzyloxy-8-chloro-1,2,3,4-tetrahydro-4-oxo-2-naphthylmethyl)glutaric acid (1.1 gram, 0.0024 mole) is dissolved in 50 milliliters of methanol and 1 drop of concentrated sulfuric acid is added. The solution is refluxed on a steam bath for 2 hours, concentrated in vacuo to approximately 8 milliliters and diluted with 50 milliliters of ethyl acetate. The ethyl acetate solution is washed thrice with 20 milliliter portions of 1 N sodium bicarbonate and thrice with 20 milliliter portions of water. The organic layer is dried over anhydrous magnesium sulfate, filtered and concentrated to an oily residue in vacuo. Yield of crude dimethyl 3-(5-benzyloxy-8-chloro-1,2,3,4-tetrahydro-4-oxo-naphthylmethyl)glutarate is 1.0 gram.

Recrystallization of crude diester from ether-petroleum-ether produces an analytical sample, colorless crystals, M.P. 62–63°.

*Analysis.*—Calculated for $C_{25}H_{27}O_6Cl$: C, 65.43; H, 5.93. Found: C, 65.10; H, 6.04.

EXAMPLE 14

*Preparation of methyl 5-benzyloxy-8-chloro-1,2,3,4,4a,9,9a,10-octahydro-4,10-dioxo-2-anthraceneacetate*

Dimethyl 3-(5-benzyloxy-8-chloro-1,2,3,4-tetrahydro-4-oxo-naphthylmethyl)glutarate (1.73 grams, 0.0037 mole) is dissolved in 100 milliliters of toluene. Sodium hydride (230 milligrams, 0.010 mole) is added and the mixture refluxed under nitrogen for 4.5 hours, cooled to room temperature and allowed to stand overnight. Additional sodium hydride (150 milligrams, 0.0063 mole) is added and the reaction is refluxed 1.5 hours. The excess hydride is decomposed by the addition of 2 milliliters of methanol. The solution is diluted with 50 milliliters of chloroform, washed twice with 25 milliliter portions of 1 N hydrochloric acid and twice with 25 milliliter portions of water. The organic layer is separated, dried over anhydrous magnesium sulfate, filtered and concentrated to an oily residue in vacuo. The residue is dissolved in 50 milliliters of ether and 80 milliliters of hexane added. Upon standing at 5° overnight small white crystals are deposited. The yield of methyl-5-benzyloxy-8-chloro-1,2,3,4,4a,9,9a,10 - octahydro - 4,10 - dioxo - 2 - anthracene-acetate is 495 milligrams, M.P. 100–105°. Work-up of the filtrate yields an additional 200 milligrams of the desired product. Total yield of crystalline material is 44° of theory. Repeated recrystallization of crude product from ether raises the M.P. to 117–121°.

*Analysis.*—Calculated for $C_{24}H_{23}ClO_5$: C, 67.5; H, 5.41; Cl, 8.31. Found, C, 67.47; H, 5.58; Cl, 8.85.

EXAMPLE 15

*Preparation of methyl 5-benzyloxy-10-hydroxy-8-chloro-1,2,3,4-tetrahydro-4-oxo-2-anthraceneacetate*

Crystalline methyl 5-benzyloxy-8-chloro-1,2,3,4,4a,9,9a,10-octahydro-4,10-dioxo-2-anthraceneacetate (6.5 grams) is dissolved in a mixture of ethyl acetate (40 milliliters) and glacial acetic acid (80 milliliters). Anhydrous sodium acetate power (1.75 grams) is added and the mixture stirred magnetically until a solution is obtained. The reaction vessel is cooled to 0–5° and to the contents are slowly added, with stirring, 16 milliliters of a 1M solution of bromine in glacial acetic acid. After addition of the bromine solution, an aliquot of the reaction possesses an ultraviolet absorption ratio ($\epsilon$ 360/$\epsilon$ 335) of 0.55 in 0.1 N alkali. The entire reaction mixture is poured into benzene, the benzene solution washed with salt solution containing a little sodium sulfite, then with four successive portions of water. The benzene layer is dried over magnesium sulfate and the solvent removed to give the crude bromoketone (7.0 grams) as a pale pink foam.

The bromoketone is dissolved in 45 milliliters freshly distilled collidine and the solution heated under nitrogen at reflux for 12 minutes. The cooled supernatant is separated from solid collidine hydrobromide by decantation, the solid washed with ether-benzene and the ether and collidine solutions combined. The extracts are washed with ice-cold 3 N sulfuric acid until the collodine odor is no longer present. The organic extracts are dried over magnesium sulfate and the solvent evaporated in vacuo. There remain 5.5 grams (84%) of methyl 5-benzyloxy-10-hydroxy - 8 - chloro - 1,2,3,4 - tetrahydro - 4 - oxo - 2-anthraceneacetate. The analytical sample is obtained from ether, M.P. 132–134°.

*Analysis.*—Calculated for $C_{24}H_{21}O_5Cl$: C, 67.84; H, 4.98. Found: C, 67.45; H, 5.47.

EXAMPLE 16

*Preparation of methyl 5-benzyloxy-10-methoxy-8-chloro-1,2,3,4-tetrahydro-4-oxo-2-anthraceneacetate*

To a solution of the product of Example 15 and dimethyl sulfate (3.2 milliliters) in anhydrous toluene (160 milliliters) is added micronized anhydrous potassium carbonate (33 grams, previously dried 12 hours at 130°) and the stirred suspension held at reflux for six hours. The cooled mixture is filtered through a sintered-glass suction funnel and the filter cake ($K_2CO_3$) washed with benzene. The combined filtrates are reduced to 30 milliliters in vacuo and chromatographed over 100 grams of alumina. Eluates corresponding to (A) benzene to benzene-10% ethyl acetate and (B) benzene-25% ethyl acetate to benzene-50% ethyl acetate are separately collected. Concentration and recrystallization of the residues from ether gives from (A) 0.80 gram of yellow needles, M.P. 129–130°; from (B) 1.24 grams tan needles, M.P. 127–128°; mixed M.P. 127–128.5°.

The analytical sample is prepared from (B) by recrystallization from ether and drying in vacuo at 65°.

Analysis.—Calculated for $C_{25}H_{23}O_5Cl$: C, 68.36; H, 5.29; $OCH_3$, 14.1. Found: C, 68.49; H, 5.86; $OCH_3$, 14.65.

EXAMPLE 17

Preparation of 5-benzyloxy-10-methoxy-8-chloro-1,2,3,4-tetrahydro-4-oxo-2-anthracene acetic acid A solution of 2.5 grams potassium hydroxide, 4 milliliters water and 35 milliliters methanol is brought to reflux and allowed to cool in a nitrogen atmosphere. To the cold solution is added the product of Example 16 (1.17 grams), and the suspension brought to reflux under nitrogen. After one hour of reflux the solution is evaporated in vacuo to approximately one half the original volume. The reaction mixture is poured into excess ice-cold 1 N sulfuric acid and the organic product extracted into ethyl acetate. The ethyl acetate is washed twice with water and dried over magnesium sulfate. Evaporation of solvent gives 1.09 (96%) of crystalline tricyclic acid, tan needles melting at 169–171°.

The analytical sample is recrystallized three times from ethyl acetate to give straw-colored needles, M.P. 175–176°. Solvent of crystallization is removed by drying at 100° in vacuum for four hours.

Analysis.—Calculated for $C_{24}H_{21}O_5Cl$: C, 67.81; H, 4.96; $OCH_3$, 7.31. Found: C, 67.72; H, 5.06; $OCH_3$, 7.27.

EXAMPLE 18

Preparation of ethyl 10-benzyloxy-7-chloro-11-methoxy-1,3,12 - trioxo - 1,2,3,4,4a,5,12,12a - octahydronaphthacene-2-carboxylate A suspension of 1.01 grams (2.3 millimoles) of recrystallized tricyclic acid prepared in Example 17 in 50 milliliters of anhydrous toluene is stirred magnetically at room temperature under a dry nitrogen atmosphere. Addition of triethylamine (0.38 milliliter, 2.75 millimoles) effects solution of the acid. The mixture is cooled to −10° and ethyl chloroformate (0.26 milliliter, 2.75 millimoles) is added. The stirring at −10° under nitrogen is maintained for 15 minutes, at which time there is added 5.5 milliliters of 0.45 magnesio ethoxy diethyl malonate in toluene. The reaction mixture is allowed to stand at room temperature for 18 hours; it is then poured into excess cold 2 N sulfuric acid. The acyl malonate is extracted into benzene, the benzene extracts washed with sodium bicarbonate and water, dried over magnesium sulfate, and evaporated to leave 1.39 grams of product. The crude acyl malonate is a yellow gum having infrared maxima at 5.75–5.80μ and 5.94μ, and ultraviolet spectrum identical with that of the starting acid.

The acyl malonate (1.39 grams) is dissolved in 20 milliliters of toluene and evaporated to dryness in vacuo, then held at 95° at 1 mm. vacuum for one hour. The dried acyl malonate is dissolved in 35 milliliters sodium-dried reagent toluene. To the solution is added sodium hydride in oil (1.20 grams of a solid suspension ca. 52% NaH by weight) and the stirred mixture refluxed under a nitrogen atmosphere for twenty minutes.

The reaction mixture, which turns from the original very pale yellow to a strong golden-brown color, is cooled to room temperature and then cooled further in ice-water. The remaining sodium hydride is destroyed by the cautious dropwise addition of glacial acetic acid (3 milliliters) followed by the very slow addition of absolute ethanol. The resulting solution is poured into cold dilute sulfuric acid, the organic components extracted into ethyl acetate, and the extracts washed with sodium bicarbonate and water. After drying over magnesium sulfate the solvent is evaporated to leave an oil (which contains ca. 0.6 gram mineral oil from the NaH suspension). The oil is taken up in 35 milliliters dry ether and the solution scratched until crystallization commences. On standing of the solution in the icebox overnight there is obtained 415 milligrams (35%) of golden yellow crystals, M.P. 170–171°.

The analytical sample is recrystallized from ethyl acetate and dried at 100° for four hours in vacuum; golden needles, M.P. 169–171°.

Analysis.—Calculated for $C_{29}H_{25}O_7Cl$: C, 66.88; H, 4.84; $OCH_3$, 11.90. Found: C, 66.85; H, 5.08; $OCH_3$, 11.11.

We claim:

1. A compound of the formula:

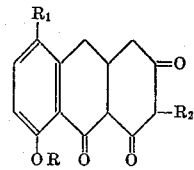

wherein $R_1$ is selected from the group consisting of chlorine and bromine, R is a member of the group consisting of hydrogen, lower alkyl, and phenyl lower alkyl radicals, and $R_2$ is a member of the group consisting of hydrogen, carboxamido, and lower carbalkoxy radicals.

2. A compound of the formula:

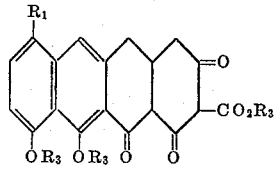

wherein $R_1$ is selected from the group consisting of chlorine and bromine, $R_3$ is lower alkyl, and R is a member of the group consisting of hydrogen, lower alkyl, and phenyl lower alkyl radicals.

3. The method of preparing a compound of the formula:

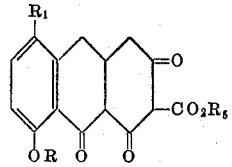

wherein $R_1$ is selected from the group consisting of chlorine and bromine, $R_3$ is lower alkyl, and R is a member of the group consisting of hydrogen, lower alkyl, and phenyl lower alkyl radicals which comprises treating a 4-oxo-1,2,3,4 - tetrahydro - 2 - naphthaleneacetyl chloride with a di(lower)alkyl magnesiomalonate to form the corresponding acyl malonic ester and cyclizing said ester with sodium hydride to form the corresponding 1,3,9-trioxo - 1,2,3,4,4a,9,9a,10 - octahydroanthracene - 2 - carboxylate.

4. The method of preparing a compound of the formula:

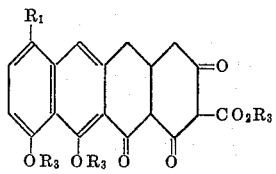

wherein $R_1$ is selected from the group consisting of chlorine and bromine, $R_3$ is lower alkyl, and R is a member of the group consisting of hydrogen, lower alkyl, and phenyl lower alkyl radicals which comprises treating a 4-oxo-1,2,3,4-tetrahydro-2-anthraceneacetyl chloride with a di(lower)alkyl magnesiomalonate to form the corresponding acyl malonic ester and cyclizing said ester with sodium hydride to form the corresponding 1,3,12-trioxo-1,2,3,4,4a,5,12,12a - octahydronaphthacene-2-carboxylate.

5. 2-carbethoxy-5-chloro-8-methoxy - 1,3,9 - trioxo-1,2,3,4,4a,9,9a,10-octahydroanthracene.

6. Ethyl 8 - benzyloxy-5-chloro-1,2,3,4,4a,9,9a,10-octahydro-1,3,9-trioxo-2-anthroate.

7. Ethyl 5-chloro-1,2,3,4,4a,9,9a,10-octahydro - 8 - hydroxy-1,3,9-trioxo-2-anthroate.

8. 5-chloro-8-methoxy - 1,3,9 - trioxo - 1,2,3,4,4a,9,9a,10-octahydroanthracene.

9. 2-carboxamido-5-chloro-8-methoxy - 1,3,9 - trioxo-1,2,3,4,4a,9,9a,10-octahydroanthracene.

10. 5 - chloro - 1,2,3,4,4a,9,9a,10 - octahydro - 8 - hydroxy-1,3,9-trioxo-2-anthramide.

11. Ethyl 10-benzyloxy - 7 - chloro-11-methoxy-1,3,12-trioxo-1,2,3,4,4a,5,12,12a-octahydronaphthacene - 2 - carboxylate.

References Cited in the file of this patent

UNITED STATES PATENTS

| | | |
|---|---|---|
| 2,744,931 | Broschard et al. | May 8, 1956 |
| 2,783,261 | Conover | Feb. 26, 1957 |

OTHER REFERENCES

Richter: Textbook of Organic Chemistry, pages 196 and 442, J. Wiley (1952).

Muxfeldt et al.: Chem. Abst., 53, 16088 (1959).

UNITED STATES PATENT OFFICE
CERTIFICATION OF CORRECTION

Patent No. 3,002,993                                      October 3, 1961

Raymond G. Wilkinson et al.

It is hereby certified that error appears in the above numbered patent requiring correction and that the said Letters Patent should read as corrected below.

Column 10, lines 33 to 39, the formula should appear as shown below instead of as in the patent:

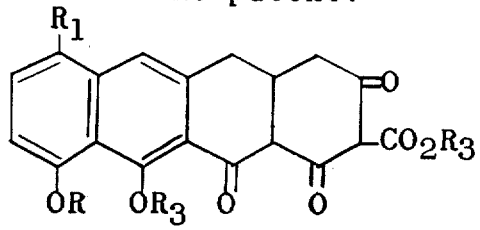

same column 10, lines 46 to 52, the formula should appear as shown below instead of as in the patent:

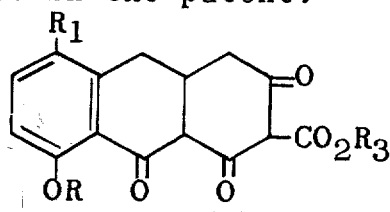

same column 10, lines 65 to 72, the formula should appear as shown below instead of as in the patent:

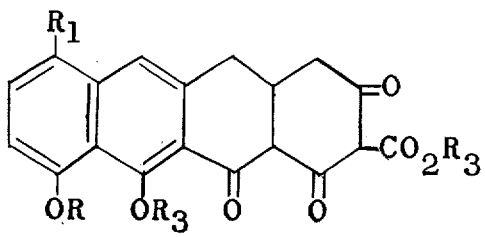

Signed and sealed this 3rd day of April 1962.

(SEAL)
Attest:

ERNEST W. SWIDER
Attesting Officer

DAVID L. LADD
Commissioner of Patents